(12) United States Patent
Ward et al.

(10) Patent No.: US 9,896,034 B2
(45) Date of Patent: Feb. 20, 2018

(54) CARGO ACCESSORY MODULAR ADAPTER

(71) Applicant: Cequent Performance Products, Inc., Plymouth, MI (US)

(72) Inventors: Brian Wayne Ward, Swartz Creek, MI (US); Gail Rae Matheus, Salem, MI (US); Sean Michael Phillips, Huntsville (CA)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 0 days.

(21) Appl. No.: 13/826,462

(22) Filed: Mar. 14, 2013

(65) Prior Publication Data

US 2013/0193175 A1 Aug. 1, 2013

Related U.S. Application Data

(63) Continuation-in-part of application No. PCT/US2012/049521, filed on Aug. 3, 2012.

(60) Provisional application No. 61/515,693, filed on Aug. 5, 2011.

(51) Int. Cl.
  *B60R 9/10* (2006.01)
  *B60R 9/04* (2006.01)
  *B60R 9/045* (2006.01)
  *B60R 9/00* (2006.01)

(52) U.S. Cl.
  CPC ............... *B60R 9/04* (2013.01); *B60R 9/00* (2013.01); *B60R 9/045* (2013.01); *B60R 9/10* (2013.01)

(58) Field of Classification Search
  CPC .. B60R 9/10; B60R 9/058; B60R 9/04; B60R 9/00; B60R 9/042; B60R 9/0423; B60R 9/0426; B60R 9/045; B60R 9/048; B60R 9/0485; B60R 9/05; B60R 9/052; B60R 9/055; B60R 9/08
  USPC .............. 224/319, 321–326, 309; 248/228.3, 248/231.41, 229.12, 229.22, 230.3
  See application file for complete search history.

(56) References Cited

U.S. PATENT DOCUMENTS

| | | | |
|---|---|---|---|
| 3,544,049 A | * | 12/1970 | Ribble ...................... F16L 3/23 248/231.41 |
| 4,483,471 A | | 11/1984 | Prosen |
| 4,662,590 A | | 5/1987 | Hungerford, Jr. |

(Continued)

OTHER PUBLICATIONS

International Search Report for PCT Publication No. WO2013/022749 dated Oct. 22, 2012.

(Continued)

*Primary Examiner* — Scott McNurlen
(74) *Attorney, Agent, or Firm* — McDonald Hopkins LLC (57) ABSTRACT

A cargo mounting system is shown and described. The cargo mounting system may include a rail having first and second portions and a length, the first portion being opposite the second portion, a first engaging member positioned on the first portion of the rail, and a second engaging member positioned on the second portion of the rail. The cargo mounting system may also include at least one vehicle attaching member selectively attached to and positionable on the second engaging member of the rail, the at least one vehicle attaching member selectively attachable to a vehicle, and at least one accessory mounting member selectively attached to and positionable on at least one of the first and second engaging members, where the at least one accessory mounting member is capable of carrying an item.

14 Claims, 10 Drawing Sheets

(56) References Cited

U.S. PATENT DOCUMENTS

| | | | | |
|---|---|---|---|---|
| 4,681,247 | A | 7/1987 | Prosen | |
| 4,768,692 | A * | 9/1988 | Schneider | 224/326 |
| 5,064,335 | A | 11/1991 | Bergeron et al. | |
| 5,201,911 | A * | 4/1993 | Lee | 224/321 |
| 5,275,320 | A * | 1/1994 | Duemmler | 224/319 |
| 5,332,183 | A | 7/1994 | Kagayama | |
| 5,358,162 | A * | 10/1994 | Hill | 224/316 |
| 5,380,326 | A | 1/1995 | Lin | |
| 5,624,063 | A | 4/1997 | Ireland | |
| 5,730,343 | A | 3/1998 | Settelmayer | |
| 5,769,292 | A | 6/1998 | Cucheran et al. | |
| 5,848,743 | A * | 12/1998 | Derecktor | 224/331 |
| 5,862,966 | A | 1/1999 | Mehls | |
| 5,931,359 | A | 8/1999 | Zona | |
| 5,996,869 | A | 12/1999 | Belinky et al. | |
| 6,112,965 | A | 9/2000 | Lundgren | |
| 6,152,341 | A | 11/2000 | LeMay et al. | |
| 6,370,741 | B1 | 4/2002 | Lu | |
| 6,425,508 | B1 | 7/2002 | Cole et al. | |
| 6,425,509 | B1 | 7/2002 | Dean et al. | |
| 6,446,922 | B2 | 9/2002 | Irie | |
| 6,494,351 | B1 | 12/2002 | Dean | |
| 6,622,898 | B1 | 9/2003 | Wang | |
| 6,789,557 | B1 | 9/2004 | Wahl, Jr. | |
| 6,851,590 | B2 | 2/2005 | Dean | |
| 6,868,998 | B2 | 3/2005 | Dean | |
| 6,892,913 | B1 | 5/2005 | Andersson | |
| 7,118,016 | B1 | 10/2006 | Kolda | |
| 7,179,010 | B2 * | 2/2007 | Weger | F16L 3/24 248/72 |
| 7,237,704 | B2 | 7/2007 | Dean | |
| 7,401,715 | B2 | 7/2008 | Edgerly | |
| 7,562,855 | B2 | 7/2009 | Oetlinger | |
| 7,647,676 | B2 | 1/2010 | Carnevali | |
| 7,726,529 | B2 | 6/2010 | Foley | |
| 8,113,397 | B2 * | 2/2012 | Magnusson | 224/324 |
| 8,176,603 | B2 | 5/2012 | Carnevali | |
| 8,196,789 | B2 | 6/2012 | Kraeuter et al. | |
| 8,267,293 | B2 * | 9/2012 | Liu | 224/324 |
| 8,366,341 | B2 | 2/2013 | Bevirt | |
| 8,393,508 | B2 | 3/2013 | Sautter et al. | |
| 8,490,937 | B2 | 7/2013 | Crain et al. | |
| 8,496,145 | B2 | 7/2013 | Sautter et al. | |
| 8,505,793 | B2 | 8/2013 | Foley | |
| 2003/0071097 | A1 | 4/2003 | Dean | |
| 2003/0189072 | A1 * | 10/2003 | Edgerly | 224/42.26 |
| 2005/0035167 | A1 | 2/2005 | Threet et al. | |
| 2005/0263554 | A1 | 12/2005 | Naslund et al. | |
| 2010/0078454 | A1 | 4/2010 | Sautter et al. | |
| 2011/0132946 | A1 | 6/2011 | Sautter et al. | |
| 2011/0139841 | A1 | 6/2011 | Sautter et al. | |
| 2011/0303711 | A1 | 12/2011 | McMillan | |
| 2012/0018977 | A1 | 1/2012 | Stanifer et al. | |
| 2012/0018978 | A1 | 1/2012 | McCoy et al. | |
| 2012/0018979 | A1 | 1/2012 | McCoy et al. | |
| 2013/0032679 | A1 * | 2/2013 | Ward et al. | 248/229.11 |

OTHER PUBLICATIONS

International Search Report and the Written Opinion of the International Searching Authority, PCT/US2012/049151, Cequent Performance Products, Inc., dated Oct. 25, 2012.

* cited by examiner

CARGO ACCESSORY MODULAR ADAPTER

CROSS-REFERENCE TO RELATED APPLICATION

This application is a continuation-in-part of International Application No.: PCT/US2012/049521U.S., entitled "Cargo Accessory Modular Adapter" filed on Aug. 3, 2012, which claims the benefit from U.S. Provisional Patent Application No. 61/515,693 entitled "Cargo Accessory Modular Adapter" filed on Aug. 5, 2011, both of which are hereby incorporated in their entirety by reference.

TECHNICAL FIELD

The present invention generally relates to a cargo carrying accessory and, more particularly, to a cargo carrying accessory modular adapter and assembly.

BACKGROUND

Vehicles are available in many different shapes and sizes. Vehicles, regardless of their shape or size have a limit on the amount of cargo space available within the vehicle. In order to expand upon this limited cargo space, cargo management systems have been developed to help create additional cargo capacity for a vehicle. These cargo management systems are typically capable of carrying additional items in a predetermined manner, relieving vehicles of some of their cargo restraints.

Many of the available cargo management systems attach to the exterior of the vehicle and carry items outside of the vehicle. For example, there are cargo management systems that attach to roofs of vehicles, on luggage racks, in the load bed of a vehicle, and the like—each of which may carry items on the exterior of the vehicle.

However, installing and uninstalling cargo management systems from vehicles can often be time consuming and difficult. Still further, such cargo management systems are inflexible and provide little to no modularity. The lack of modularity and flexibility make it difficult to attach to the vehicle, limits the available uses of the system, and makes it difficult to store when not in use. Therefore, there is a need for a more modular and flexible cargo management system that may be capable of attaching to different kinds of vehicles, different kinds of attachment systems, and provides the ability to attach different kinds, shapes, and sizes of items.

DESCRIPTION OF THE DRAWINGS

The operation of the invention may be better understood by reference to the following detailed description taken in connection with the following illustrations, wherein.

SUMMARY

A cargo mounting system is shown and described. The cargo mounting system may include a rail having first and second portions and a length, the first portion being opposite the second portion, a first engaging member positioned on the first portion of the rail, and a second engaging member positioned on the second portion of the rail. The cargo mounting system may also include at least one vehicle attaching member selectively attached to and positionable on the second engaging member of the rail, the at least one vehicle attaching member selectively attachable to a vehicle, and at least one accessory mounting member selectively attached to and positionable on at least one of the first and second engaging members, where the at least one accessory mounting member is capable of carrying an item.

A cargo mounting system may include a rail having first and second portions and a length, and at least one engaging member positioned on the rail between the first and second end portions, the at least one engaging member having an engaging member length. The cargo mounting system may include an accessory mounting member selectively securable on the at least one engaging member at any location along the engaging member length.

A cargo mounting system may include a rail having first and second portions and a length, and at least one engaging member positioned on the rail between the first and second end portions, the at least one engaging member having an engaging member length. The cargo mounting system may also include at least one clamping assembly selectively securable on the at least one engaging member at any location along the engaging member length, where the at least one clamping assembly is selectively securable to a plurality of different shaped roof rails.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
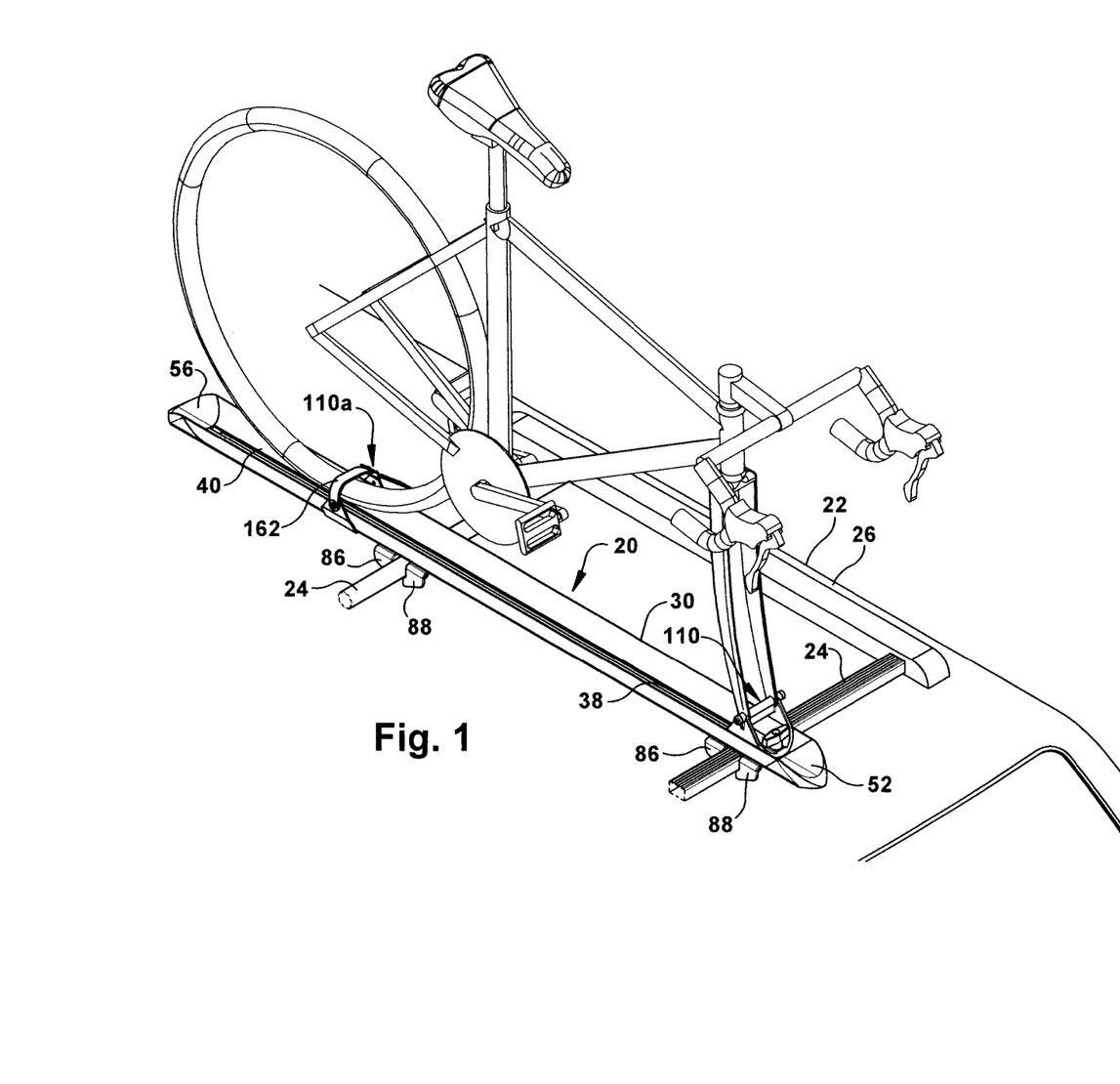
FIG. 1 is a perspective view of a cargo mounting system attached to a portion of a roof rack of a vehicle with a bike attached thereto.
Figure 2:
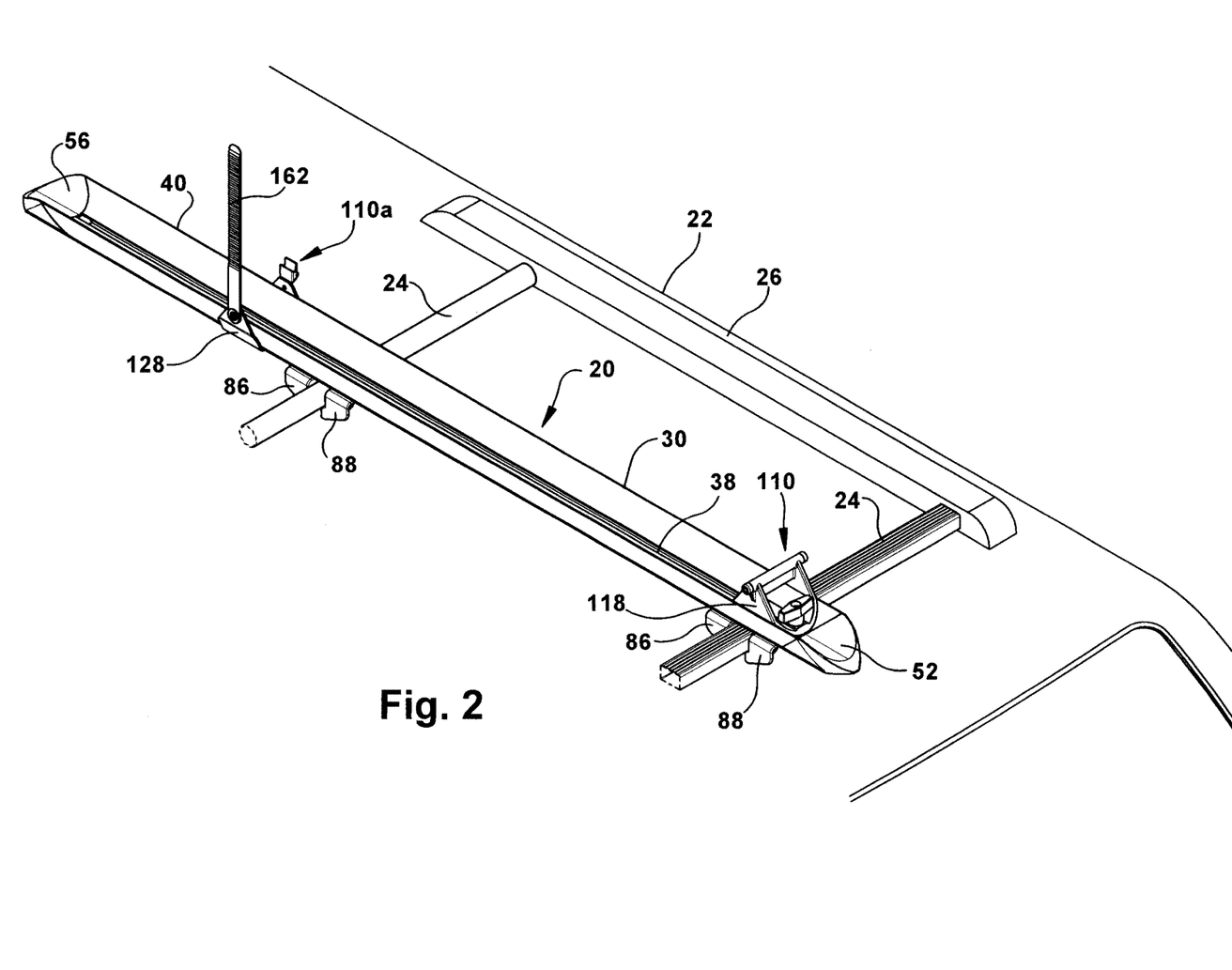
FIG. 2 is a perspective view of the cargo mounting system attached to a portion of a roof rack of a vehicle.

A cargo mounting system 20 is shown in FIGS. 1-11. The cargo mounting system may be capable of attaching to a vehicle 22 in any appropriate manner, an example of which is shown in FIGS. 1 and 2. The cargo mounting system 20 may be used to attach a variety of accessories to the vehicle 22. By way of a non-limiting example, the cargo mounting system 20 may be selectively attached to a roof rack cross bar 24 of the vehicle 22 as described in more detail below. The cargo mounting system 20 may be capable of securing items and accessories in any appropriate location on the vehicle 22, such as by way of a non-limiting example, to a roof 26 of the vehicle 22. It should be understood, however, that the present teachings should not be limited to the cargo mounting system 20 being selectively attached to the roof rack 26 of the vehicle 22 as shown in FIGS. 1 and 2. The cargo mounting system 20 may be selectively attached to any appropriate portion of the vehicle 22 or to any appropriate vehicle mounting assembly, including, without limitation a hitch receiver, a trunk rack, a load bed and the like.

The cargo mounting system 20 may include a rail 30 that may be selectively attachable to the vehicle 22, such as by way of a non-limiting example to the roof 26 of the vehicle 22. While a single rail 30 is shown in the drawings, the cargo mounting system 20 may include any number of rails 30, such as by way of non-limiting examples, the cargo mounting system 20 may include a pair of rails 30, three rails, four rails or the like. The present teachings are not limited to any specific number of rails 30. The appropriate number of rails 30 to be used with the cargo mounting system 20 may depend upon the particular use of the cargo mounting system 20, e.g., the location it is to be mounted on the vehicle 22, the items which may be secured to the cargo mounting system 20 and the like.

The rails 30 of the cargo mounting system 20 may include at least one engaging member 38 positioned thereon. The engaging member 38 may be of any appropriate size and shape. By way of non-limiting examples, the engaging member 38 may include tracks, channels, slots, or any combination of such positioned in the rails 30. The engaging member 38 may allow assemblies to secure the cargo mounting system 20 to the vehicle 22, such as to the roof cross bars 24, and may allow mounting accessories to be selectively attached to the engaging member 38. The engaging member 38 may allow for modularity for the cargo mounting system 20 between the accessory components for the roof 26, cargo carriers and mounting points on the vehicle 22 as may be described in further detail below. It should be appreciated that the features, components, elements and functionalities of the various embodiments may be combined or altered to achieve a cargo mounting system 20 without departing from the spirit and scope of the present teachings.

In some embodiments, the rail 30 may include the first engaging member 38 and a second engaging member 39, such as shown in the drawings. While two engaging members 38, 39 are shown in the drawings, any number of engaging members may be used without departing from the present teachings. The first engaging member 38 may be a generally T-shaped slot 38 and may be located on a first portion 40 of the rail 30, such as by way of a non-limiting example, the top portion 40 of the rail 30. In some embodiments, the generally T-shaped slot 38 may extend the entire length of the rail 30. In the alternative, the generally T-shaped slot 38 may only extend a portion of the length of the rail 30. Additionally, while one generally T-shaped slot 38 is shown any number of slots may be used as the first engaging member 38. Still further, while the slot 38 is shown and described as a generally T-shaped slot, it is not limited to such. The slot 38 may be of any appropriate shape and size, e.g., dovetail, L-shaped, C-shaped, or any other appropriate shape.

The second engaging member 39 may be located on a second portion 48 of the rail 30, such as by way of a non-limiting example, on the bottom portion 48 of the rail 30. The second engaging member 39 may be of any appropriate shape and size. In some embodiments, the first and second engaging members 38, 39 may be of substantially similar construction. In addition, in some embodiments the first and second engaging members 38, 39 may be of generally different construction. The present teachings are not limited to such. The second engaging member 39 may include a pair of generally T-shaped slots 50, as shown in more detail in FIGS. 3 and 5. While two generally T-shaped slots 50 are shown any number of slots may be used for the second engaging member 39. Moreover, while the slots 50 are shown and described as generally T-shaped slots, they are not limited to such. The slots 50 may be of any appropriate shape and size, e.g., dovetail, L-shaped, C-shaped, or any other appropriate shape. Still further, while the slots 50 are shown as being generally similar, the present teachings are not limited to such. One of the pair of slots 50 may have a first shape and size and the other of the pair of slots 50 may be of a different shape and size. Still further, the pair of generally T-shaped slots 50 may extend the entire length of the rail 30. In the alternative, the generally T-shaped slots 50 may only extend a portion of the length of the rail 30.

The rail 30 may further include a first end portion 52 and a second end portion 56 that may be capable of selectively and/or fixedly attaching to the rail 30. In some embodiments, the first and second end portions 52, 56 may each include engaging devices 60, 64 that may be capable of engaging with the second engaging member 39. By way of a non-limiting example, the engaging devices 60, 64 may include male generally T-shaped member 60, 64, which may both be capable of selectively engaging the pair of generally T-shaped slots 50 of the rail 30. In addition, the first and second end portions 52, 56 may be of a generally same profile and shape as that of the rail 30 such that when attached the combination thereof has a generally continuous shape. This may allow the first and second end portions 52, 56 to be selectively attachable to the rail 30. Still further, the first end portion 52 may include a front portion that has a generally aerodynamic shape and the second end portion 56 may have an end portion that may generally create a terminus end. This may form a rail 30 that has an aerodynamic front portion such that when it is placed on the roof 26 of the vehicle 22 it may provide good aerodynamic characteristics. The terminus end 56 may provide a rail 30 that has a clear end portion. The rails 30 may be made of any appropriate material, such as by way of non-limiting examples, being made from steroelithography (SLA) plastic with first and second engaging members 38, 39 being made from an appropriate material such as aluminum extrusion. However, the present teachings are not limited to the specific material, the rail 30 and its components may be made from any appropriate materials, e.g., metals, plastics, rubber or any combination of such.

The cargo mounting system 20 may include at least one vehicle attachment assembly 80 that may be capable of selectively securing the cargo mounting system 20 to the vehicle 22. In some embodiments, the vehicle attachment assembly may be capable of selectively securing the cargo mounting system 20 and more specifically, the rail 30 to the roof 26 of the vehicle 22. The vehicle attachment assembly 80 may be capable of selectively securing the rail 30 to the roof rack cross bars 24 of the vehicle 22.

Figure 3:
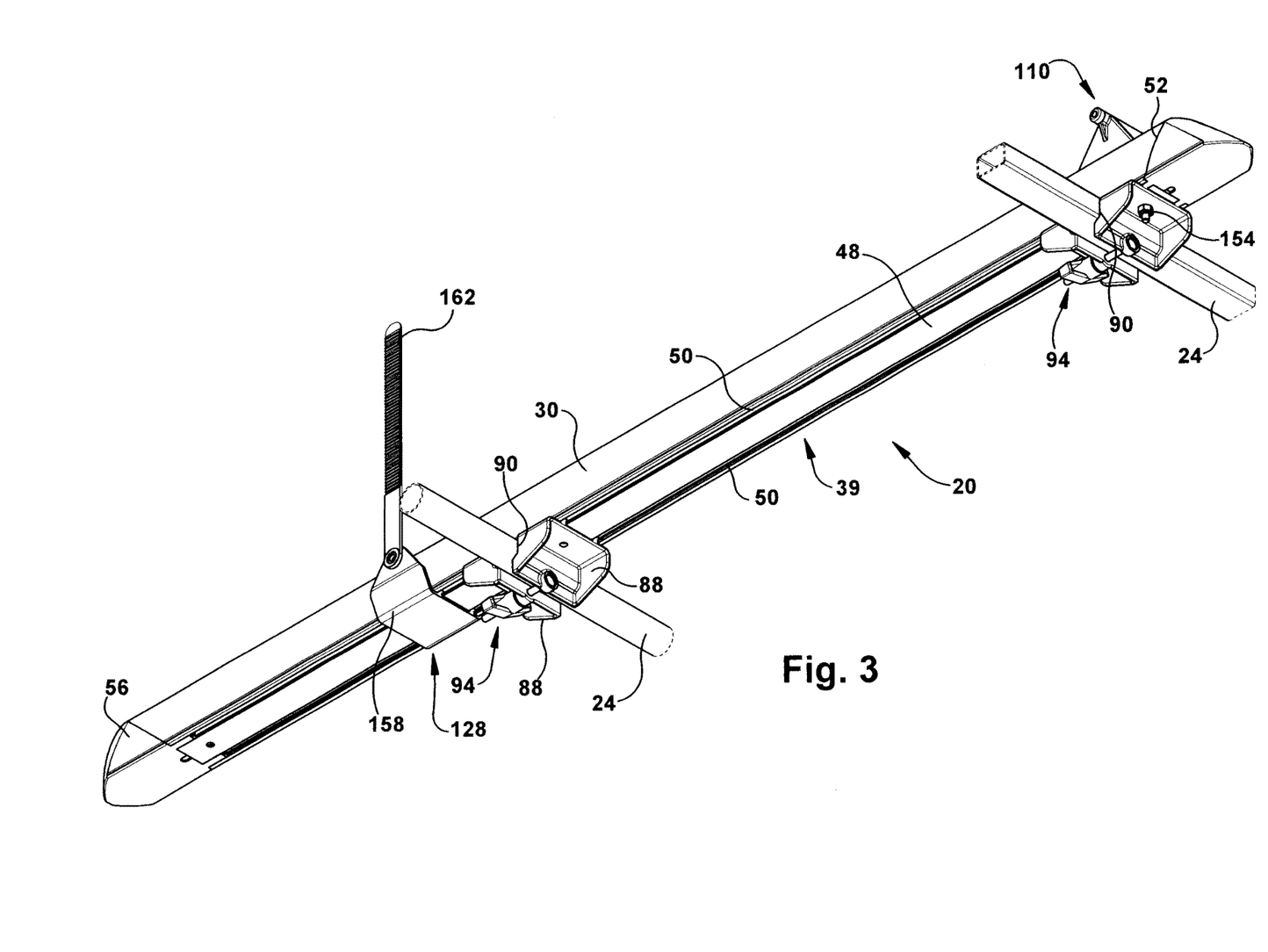
FIG. 3 is a bottom perspective view of the cargo mounting system.
Figure 4:
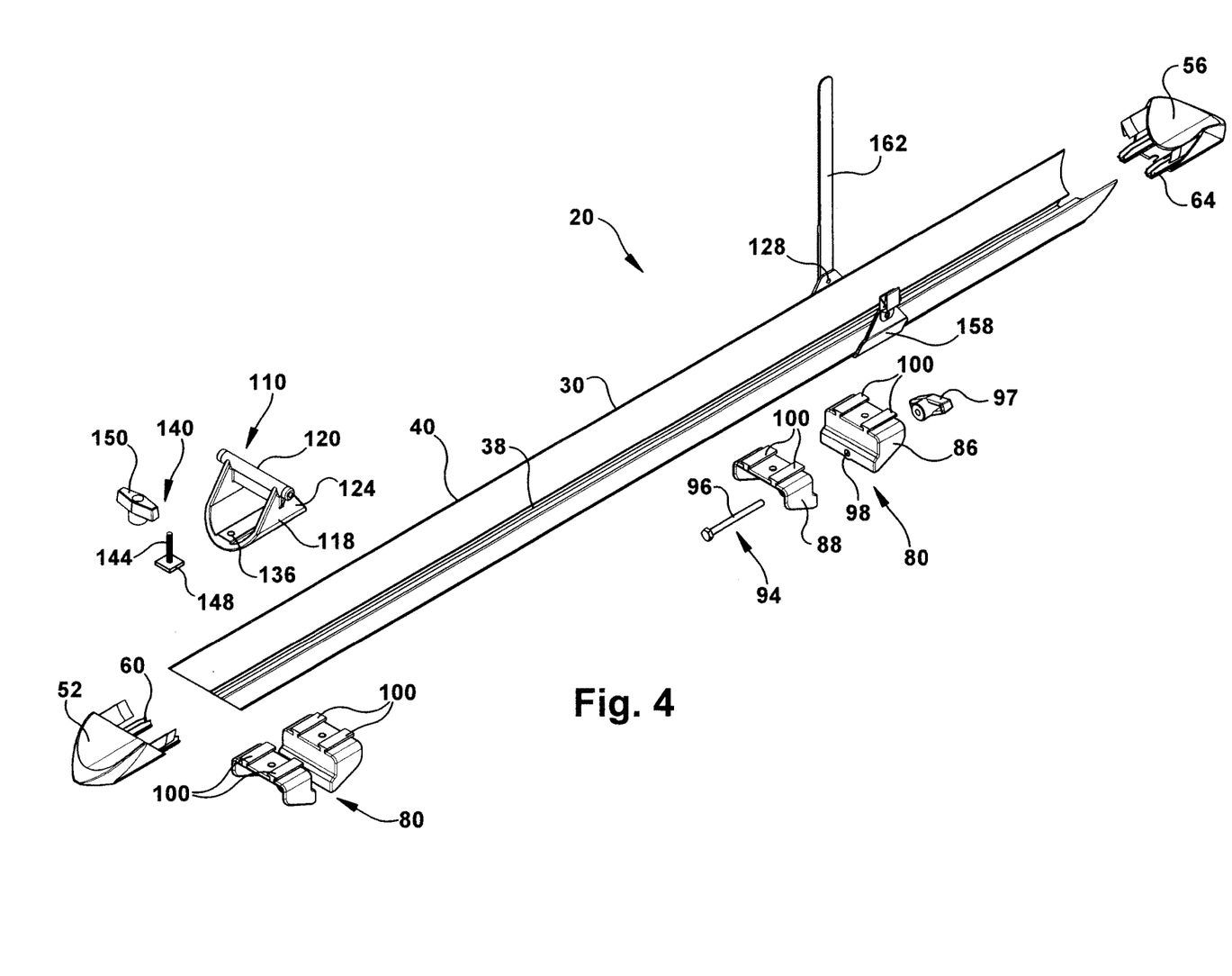
FIG. 4 is a partially exploded view of the cargo mounting system.
Figure 5:
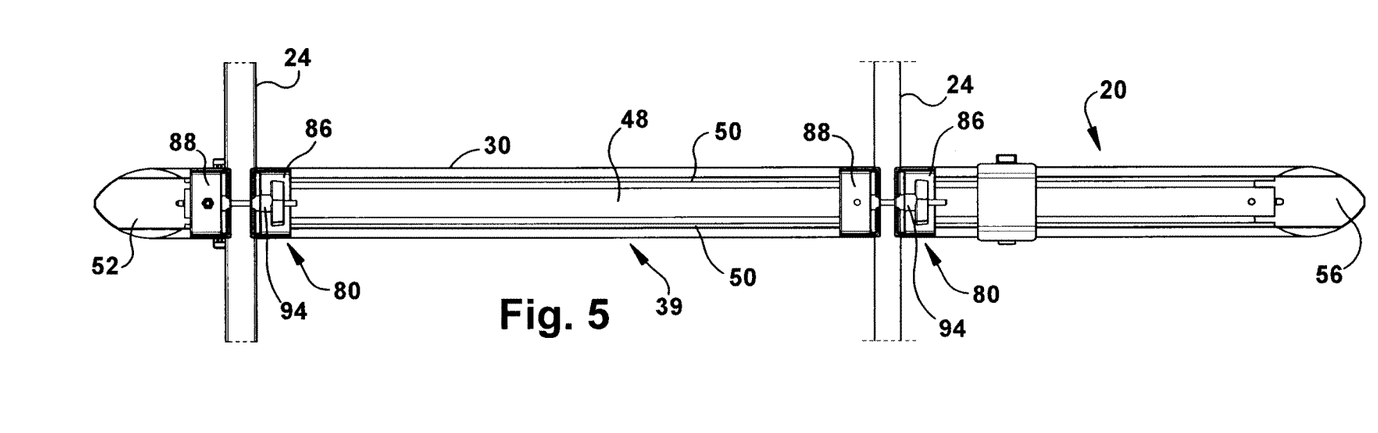
FIG. 5 is a bottom view of the cargo mounting system.
Figure 6:
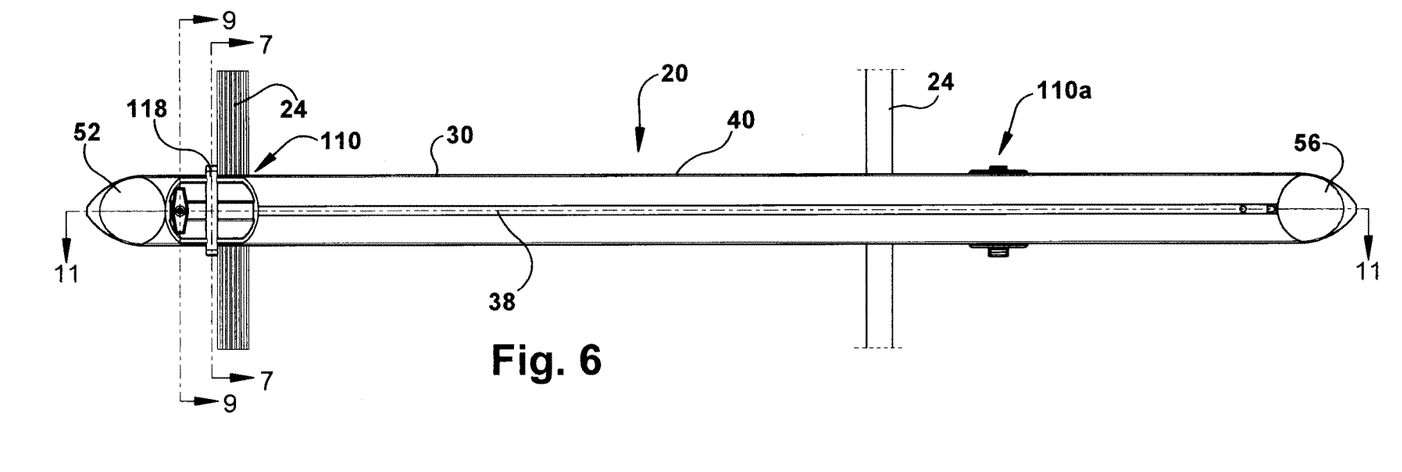
FIG. 6 is a plan view of the cargo mounting system.
Figure 7:
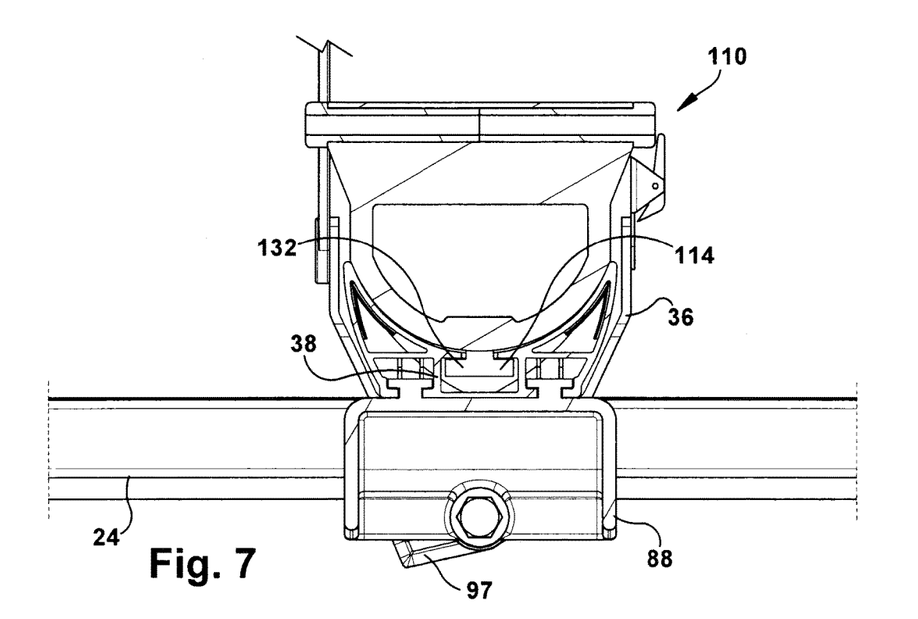
FIG. 7 is a side partial cross-sectional view of the cargo mounting system.
Figure 8:
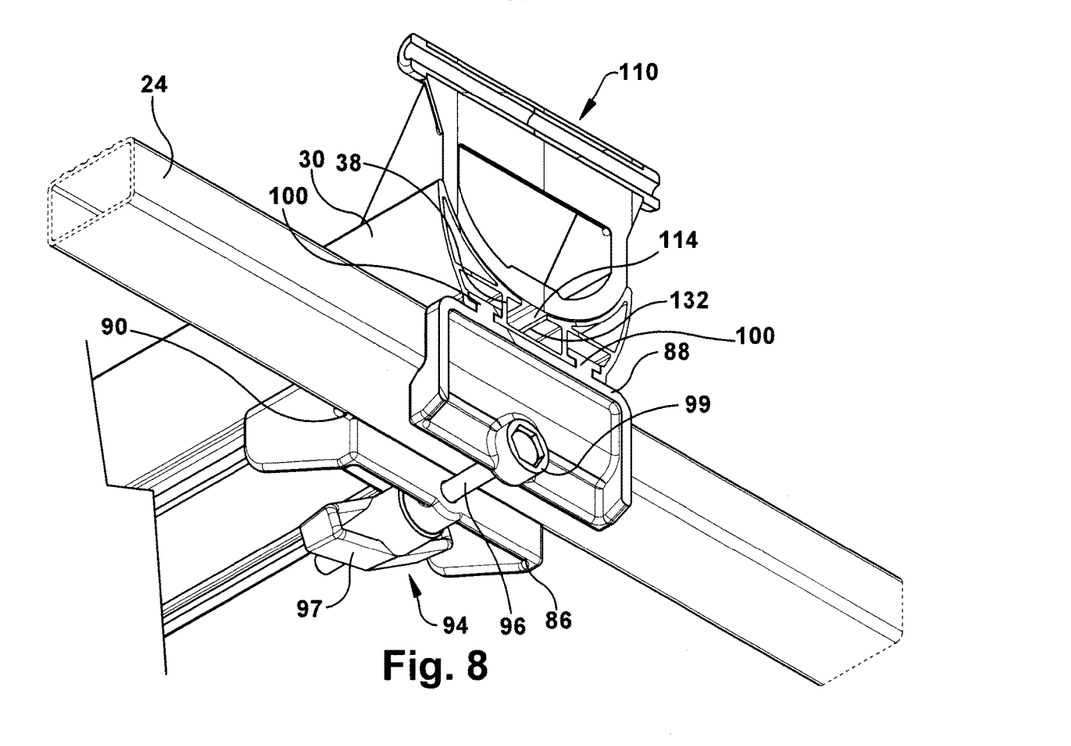
FIG. 8 is a bottom perspective and partial cross-sectional view of the cargo mounting system.
Figure 9:
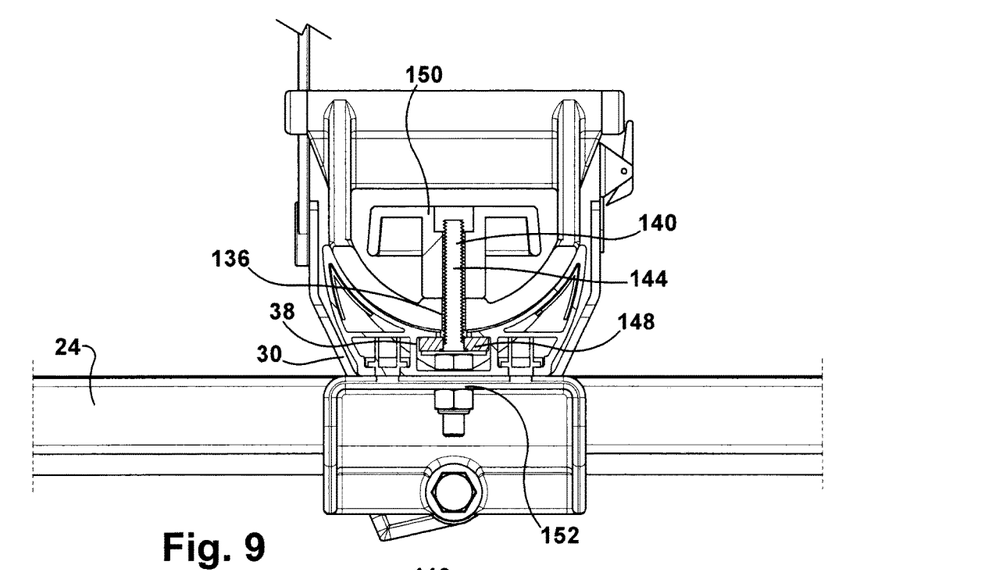
FIG. 9 is a side partial cross-sectional view of the cargo mounting system in an alternative position.
Figure 10:
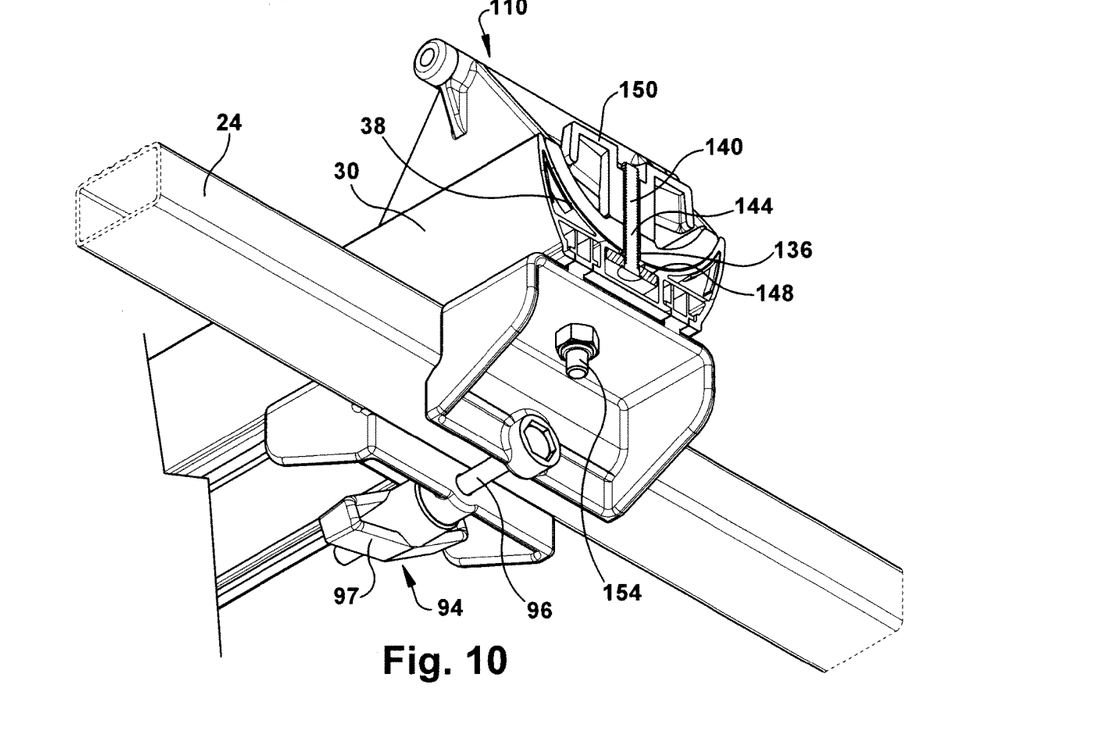
FIG. 10 is a bottom perspective and partial cross-sectional view of the cargo mounting system in an alternative position.
Figure 11:
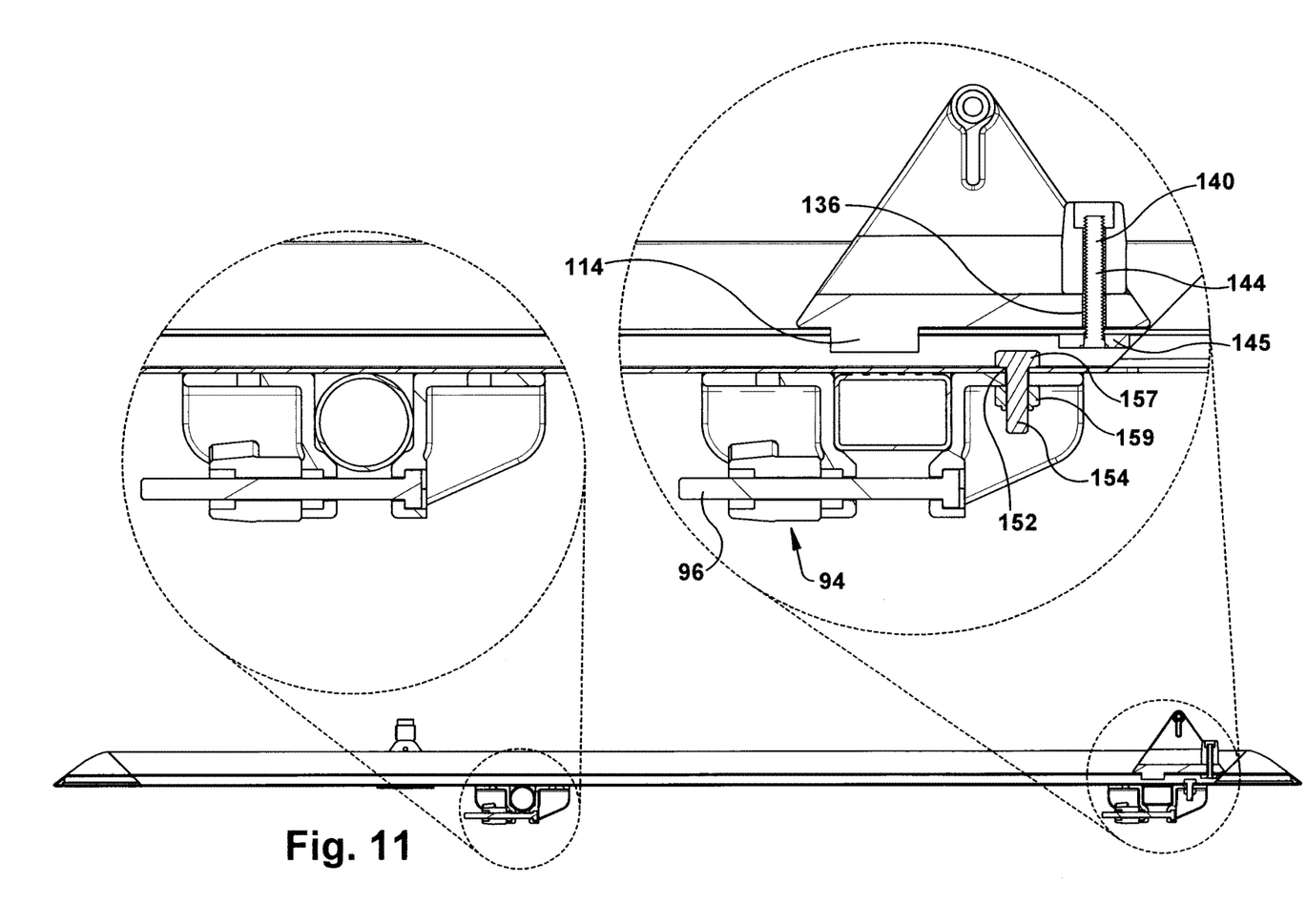
FIG. 11 is a magnified cross-sectional side view of the cargo mounting system.

The vehicle attachment assembly 80 may include a first clamping member 86 and a second clamping member 88. The first clamping member 86 may be selectively attached to the second clamping member 88 such that a portion of the roof rack cross bars 26 may be capable of being wedgingly engaged therebetween. The engagement of the first clamping member 86 and the second clamping member 88 may create a channel 90 into which the roof rack cross bar 26 may be capable of wedgingly fitting. By way of a non-limiting example, as shown in FIGS. 3 and 8, the channel 90 may be formed upon the engagement of the first and second clamping members 86, 88 to be of a shape and size to secure the vehicle attachment assembly 80 to either of a roof rack cross bar 26 that is of a generally rectangular or circular cross-sectional shape. Further, the channel 90 may be of a shape and size to secure the vehicle attachment assembly 80 to any appropriately shaped and sized roof rack cross bar 26, not just the shape shown, including, without limitation, generally square, triangular, or oval shapes or any combination of such.

The vehicle attachment assembly 80 may further include a fastener 94, such as by way of a non-limiting example a bolt 96 with a winged nut 97. The winged nut 97 may make gripping easier for the user. The fastener 94 may be any appropriate fastener, not just that shown and described herein. Further still, the fastener 94 may not include the winged nut 97. Once the first and second clamping members 86, 88 are appropriately aligned such that the roof rack cross bar 24 is positioned within the channel 90, the fastener 94 may be tightened until the first and second clamping members 86, 88 clampingly engage the roof rack cross bar 24. The first and second clamping members 86, 88 may apply sufficient force to generally hold the first and second clamping members 86, 88 together. In some embodiments, the winged nut 97 may be threaded on to the fastener 94 to engage the first and second clamping members 86, 88 together.

The first and second clamping members 86, 88 may each include an aperture 98, 99, respectively, that may be appropriately shaped and sized such that the fastener 94 may pass therethrough. This may permit the fastener 94 and the winged nut 97 threaded thereon to wedgingly engage the first and second clamping members 86, 88 together to create sufficient clamping force such that the cargo mounting system 20 may be secured to the roof rails 24 of the vehicle 22.

The vehicle attachment assembly 80 may further include a male engaging member 100 that may be capable of selectively and slidably engaging the second engaging member 39, which may be positioned on the second or bottom portion 48 of the rail 30. The male engaging member 100 may have a shape and size such that it may engage with the second engaging member 39. It should be understood, however, that while the male engaging member 100 is shown and described as a male member and the second engaging member 39 is shown and described a female engaging member, the present teachings are not limited to such. The engaging member 100 may be a female engaging member and the second engaging member 39 may be a corresponding male engaging member. Still further, while the male engaging member 100 is shown and describe as have a shape and size corresponding to the second engaging member 39, it may also have a shape and size that may correspond to the first engaging member 38—the first and second engaging members 38, 39 may have generally the same shape and size or different shape and size.

In some embodiments, the first and second clamping members 86, 88 may each include generally T-shaped male members 100 that may be capable of selectively and slidably engaging the second engaging member 39. While a generally T-shaped male member 100 is shown, any appropriate shaped member may be used such that it may correspond to the shape and size of the second engaging member 39 of the rail 30. This may result in the clamping members 86, 88 being capable of engaging and being selectively positioned along the length of the rail 30 and in particular along the length of the second engaging member 39 such as through sliding.

In these embodiments, the first and second clamping members 86, 88 may be slidably engaged with the slots 50 on the bottom portion 48 of the rail 30 so as to position the rail 30 on an appropriate position on the vehicle 22. By way of a non-limiting example, the male engaging members 100 may have a generally I-shaped cross-section that corresponds to the generally shaped slot 50 such that the male engaging members 100 may be capable of engaging and sliding along the slot 50. Specifically, the male engaging members 100 of the first and second clamping members 86, 88 may be slid onto the slots 50 and appropriately positioned along any appropriate portion on the length of the roof rack cross bars 24. The position of which may depend upon the particular use of the cargo mounting system 20, the vehicle 22 to which it is attached, the type and location of the roof bars 24 and the like.

The cargo mounting system 20 may further include at least one accessory adapter bracket 110 that may be capable of attaching to the rail 30. While the drawings show two such accessory adapter brackets 110 being used, any number of accessory adapter brackets 110 may be used depending upon the appropriate use thereof. In addition, while the accessory adapter brackets 110 are shown as being a bike rack, the present teachings are not limited to such and can be any kind of adapter brackets 110, including, without limitation a ski rack, boat rack, surf board rack, or the like. Still further, multiple of accessory adapter brackets 110 may be attached, e.g., a pair of accessory adapter brackets 110 capable of holding a bicycle and an accessory adapter bracket 110 that may be capable of holding a ski may be used. Any combination of such can be used. The present teachings are not limited to a specific configuration.

The accessory adapter brackets 110 may allow accessories or items to be to be mounted to the rail 30, such as by way of a non-limiting example a bicycle, such as shown in FIG. 1. The adapter brackets 110 may include an engaging device 114 that may be capable of slidingly attaching to the rails 30 and to be selectively positionable along the length of the rail 30. The engaging device 114 may be of a shape and size such that it may be capable of engaging the first engaging member 38 and being selectively positioned thereon, or more particularly being selectively positionable along the length of the first engaging member 38. It should be understood, however, that while the engaging device 114 is shown and described as a male member and the first engaging member 38 is shown and described a female engaging member, the present teachings are not limited to such. The engaging device 114 may be a female engaging member and the first engaging member 38 may be a corresponding male engaging member. Still further, while the engaging device 114 is shown and described as have a shape and size corresponding to the first engaging member 38, it may also have a shape and size that may correspond to the second engaging member 39.

Further, the accessory adapter brackets 110 may include an accessory adapter body 118 to which an accessory or item may be capable of attaching. The accessory adapter body 118 may extend in a generally opposite direction to the engaging device 114 such that it may extend away from the rail 30. The accessory adapter body 118 may include an accessory attaching device 120. As shown in the drawings, the accessory attaching device 120 may be a bike-securing device 124 that may be capable of having selectively secured thereto a bicycle. Still further, the cargo mounting system 20 may include a second accessory adapter bracket 110a that may correspond to the bike-securing device 120. In such embodiments, the second accessory adapter bracket 110a may be selectively securable to the second engaging member 39 so that it may be positioned on the second portion 48 of the rail. The second accessory adapter bracket 110a may include a strap member 128 that may be capable of securing the bicycle to the rail 30. In such embodiments, the accessory attaching device 120 may secure a front portion of the bicycle and the strap member 128 may secure a rear portion of the bicycle to the rail 30.

While the bike-securing device 124 and strap member 128 are shown, any kind of accessory attaching device 120 may be used, and the present teachings are not limited to any specific kind of accessory attaching device 120. In these embodiments, the bike-securing device 124 may include a male engaging member 132 that may be capable of slidingly engaging the first engaging member 38 of the rail 30. By way of a non-limiting example, the male engaging member 132 may be generally male T-shaped member that may be correspondingly shaped and sized with the first engaging member 38. This may allow the accessory attaching device 120, and more specifically, the bike-securing device 124 to be selectively slidable along the entire length of the first engaging member 38, or alternatively along a portion of the length of the first engaging member 38. It should be understood, however, that while male member 132 is shown and described as a male member and the first engaging member 38 is shown and described a female engaging member, the present teachings are not limited to such. The member 132 may be a female engaging member and the first engaging member 38 may be a corresponding male engaging member. Still further, while the member 132 is shown and described as having a shape and size corresponding to the first engaging member 38, it may also have a shape and size that may correspond to the second engaging member 39.

In some embodiments, the bike rack body 124 may also include an aperture 136 through which a fastener 140 may engage to further secure the bike-securing device 124 to the rail 30. In such embodiments, the fastener 140 may include a threaded body 144, a head 148 and a winged nut 150. The head 148 may be shaped and sized to slidably fit within the first engaging member 38. Once the head 148 is selectively engaged with the first engaging member 38, the winged nut 150 may then be threaded onto the threaded body 144 to further wedgingly engage the bike-securing device 124 to the rail 30.

In some embodiments, the first and second clamping members 86, 88 may include an aperture 152 through which a fastener 154 may pass and engage the rail 30. In other embodiments, only one of the first or second clamping members 86, 88 may include an aperture 152 through which the fastener 154 may pass and engage the rail 30. This fastener 154 may further secure the first and second clamping members 86, 88 to the rail 30, or may secure one of the first and second clamping members 86, 88 to the rail 30. The fastener 154 may include a head 157, such as shown in more detail in FIG. 11. The head 154 may be shaped and sized to engage at least a portion of the second engaging member 39—or more specifically, slidably engage at least one of the slots 50—such that it may selectively engage the first and/or second clamping members 86, 88 to the rail 30. A nut 159 may be capable of engaging the fastener 154 and may be tightened on the fastener 154, which may selectively secure the first and/or second clamping members 86, 88 to the rail 30. Still further, in some embodiments, the rail 30 may include an aperture (not shown) through which the fastener 154 may pass to selectively secure the first and/or second clamping members 86, 88 to the rail 30.

The strap member 128 may include a body 158 that may include a male engaging member (not shown) that may be capable of slidingly engaging the first engaging member 38 of the rail 30. By way of a non-limiting example, the male engaging member may be a generally male T-shaped member that may be correspondingly shaped and sized with the first engaging member 38. This may allow the strap member 128 to be selectively slidable along the entire length of the first engaging member 38, or alternatively along a portion of the length of the first engaging member 38. It should be understood, however, that while male engaging member is described as a male member and the first engaging member 38 is shown and described a female engaging member, the present teachings are not limited to such. The member may be a female engaging member and the first engaging member 38 may be a corresponding male engaging member. Still further, while the member is described as having a shape and size corresponding to the first engaging member 38, it may also have a shape and size that may correspond to the second engaging member 39. In such embodiments, the strap member 128 may be selectively positionable along a length of the second engaging member 39. The strap member 128 may include a strap 162 that may be capable of engaging a bike that may be attached to the cargo mounting system 20 such that the bike may be secured thereto. The strap 162 may be of a shape and size such that it may be capable of securing around a bicycle tire.

The accessory adapter bracket 110, the vehicle attachment assembly 80 and accessory adapter body 118 may be made of any appropriate material. By way of a non-limiting example, the accessory adapter bracket 110, the vehicle attachment assembly 80 and accessory adapter body 118 may be produced using glass filled nylon, extruded aluminum, die cast aluminum, steel, or steel casting. Specifically, the accessory adapter body 118 may be produced from die cast aluminum, and the first and second clamping bodies 86, 88 from glass filled nylon. However, the present teachings are not limited to a specified material. Any appropriate material may be utilized without departing from the present teachings.

In operation, the cargo mounting system 20 may allow accessories or items to mount to the vehicle 22, including to the vehicle roof 26. Further, the cargo mounting system 20 may provide the adjustability to work on multiple vehicles and work with multiple styles of accessories and items. By way of a non-limiting example, the cargo mounting system 20 may be attached to a vehicle 22 in accordance with the following—however, the present teachings are not limited to such. The generally T-shaped male members 100 of the first and second clamping members 86, 88 may slidably engage the second engaging member 39 or more particularly, the slots 50. Next, the first and second clamping members 86, 88 may be clamped around the roof rack bars 24 and may be secured together to wedgingly engage the roof rack cross bars 24. The channel 90 formed from the first and second clamping members 86, 88 may be of an appropriate size to wedgingly fit the roof bars 24 therein. The channel 90 may be of a shape such that it may be capable of wedgingly fitting with roof bars of various shapes and sizes, such as a generally circular cross-sectional shaped roof bar 24 and a generally rectangular cross-sectional shaped roof bar 24.

The accessory adapter bracket 110 may then be slidably engaged with the first engaging member 38 of the rail 30. The accessory adapter bracket 110 may be slidably positioned to the appropriate position, which may depend upon the type and style of the accessory adapter bracket 110. In some embodiments, the male member 132 of the bike-securing device 124 may selectively engage the first engaging member 38 and may be slid into place. Similarly, the head 148 of the fastener 140 may be slid into the first engaging member 38 and the winged nut 150 may be tightened further securing the bike-securing device 124 to the first engaging member 38. If appropriate, the strap member 128 may be selectively engaged with the second engaging member 39. Particularly, the male member may selectively engage the second engaging member 39 and may be positioned into the appropriate location along the rail 30. Once complete the applicable item or accessory to be carried by the cargo mounting system 20, such as by way of a non-limiting example, a bicycle may be mounted to the cargo mounting system 20. A portion of the bicycle may be selectively secured to the bike-securing device 124 and the strap 162 of the strap member 128 may selectively engage a rear tire of the bicycle.

The order of attachment of the components of the cargo mounting system 20 set forth above are not limited to the steps described above. Steps may be done in a different order and steps may be skipped and additional steps may be added without departing from the present teachings.

Additional embodiments of a cargo mounting system according the present teachings are described below. In the descriptions, all of the details and components may not be fully described or shown. Rather, the features or components are described and, in some instances, differences with the above-described embodiments may be pointed out. Moreover, it should be appreciated that these additional embodiments may include elements or components utilized in the above-described embodiments although not shown or described. Thus, the descriptions of these additional embodiments are merely exemplary and not all-inclusive nor exclusive. Moreover, it should be appreciated that the features, components, elements and functionalities of the various embodiments may be combined or altered to achieve a desired cargo mounting system without departing from the spirit and scope of the present teachings.

Embodiments of a cargo mounting system 200 may include a rail 230 that may be selectively attachable to the vehicle 22, such as by way of a non-limiting example to the roof 26 of the vehicle 22. While a single rail 230 is shown in the drawings, the cargo mounting system 200 may include any number of rails 230. The rails 230 may include at least one engaging member 238 positioned thereon. The engaging member 238 may be of any appropriate size and shape. In some embodiments, the rail 230 may include the first engaging member 238 and a second engaging member 239, such as shown in the drawings. While two engaging members 238, 239 are shown in the drawings, any number of engaging members may be used without departing from the present teachings.

The first engaging member 238 may be a generally T-shaped slot 238 and may be located on a first portion 240 of the rail 230, such as by way of a non-limiting example, the top portion 240 of the rail 230. In some embodiments, the generally T-shaped slot 238 may extend the entire length of the rail 230. In the alternative, the generally T-shaped slot 238 may only extend a portion of the length of the rail 230. Additionally, while one generally T-shaped slot 238 is shown any number of slots may be used as the first engaging member 238. Still further, while the slot 238 is shown and described as a generally T-shaped slot, it is not limited to such. The slot 238 may be of any appropriate shape and size, e.g., dovetail, L-shaped, C-shaped, or any other appropriate shape.

The second engaging member 239 may be located on a second portion 248 of the rail 230, such as by way of a non-limiting example, on the bottom portion 248 of the rail 230. The second engaging member 239 may be of any appropriate shape and size. In some embodiments, the first and second engaging members 238, 239 may be of substantially similar construction. In addition, in some embodiments the first and second engaging members 238, 239 may be of generally different construction. The present teachings are not limited to such. The second engaging member 239 may include a pair of generally T-shaped slots 250, as shown in more detail in FIG. 15. While two generally T-shaped slots 250 are shown any number may be used for the second engaging member 239. Moreover, while the slots 250 are shown and described as generally T-shaped slots, they are not limited to such. The slots 250 may be of any appropriate shape and size, e.g., dovetail, L-shaped, C-shaped, or any other appropriate shape. Still further, while the slots 250 are shown as being generally similar, the present teachings are not limited to such. One of the pair of slots 250 may have a first shape and size and the other of the pair of slots 250 may be of a different shape and size. Still further, the pair of generally T-shaped slots 250 may extend the entire length of the rail 230. In the alternative, the generally T-shaped slots 250 may only extend a portion of the length of the rail 230.

Figures 12, 13:
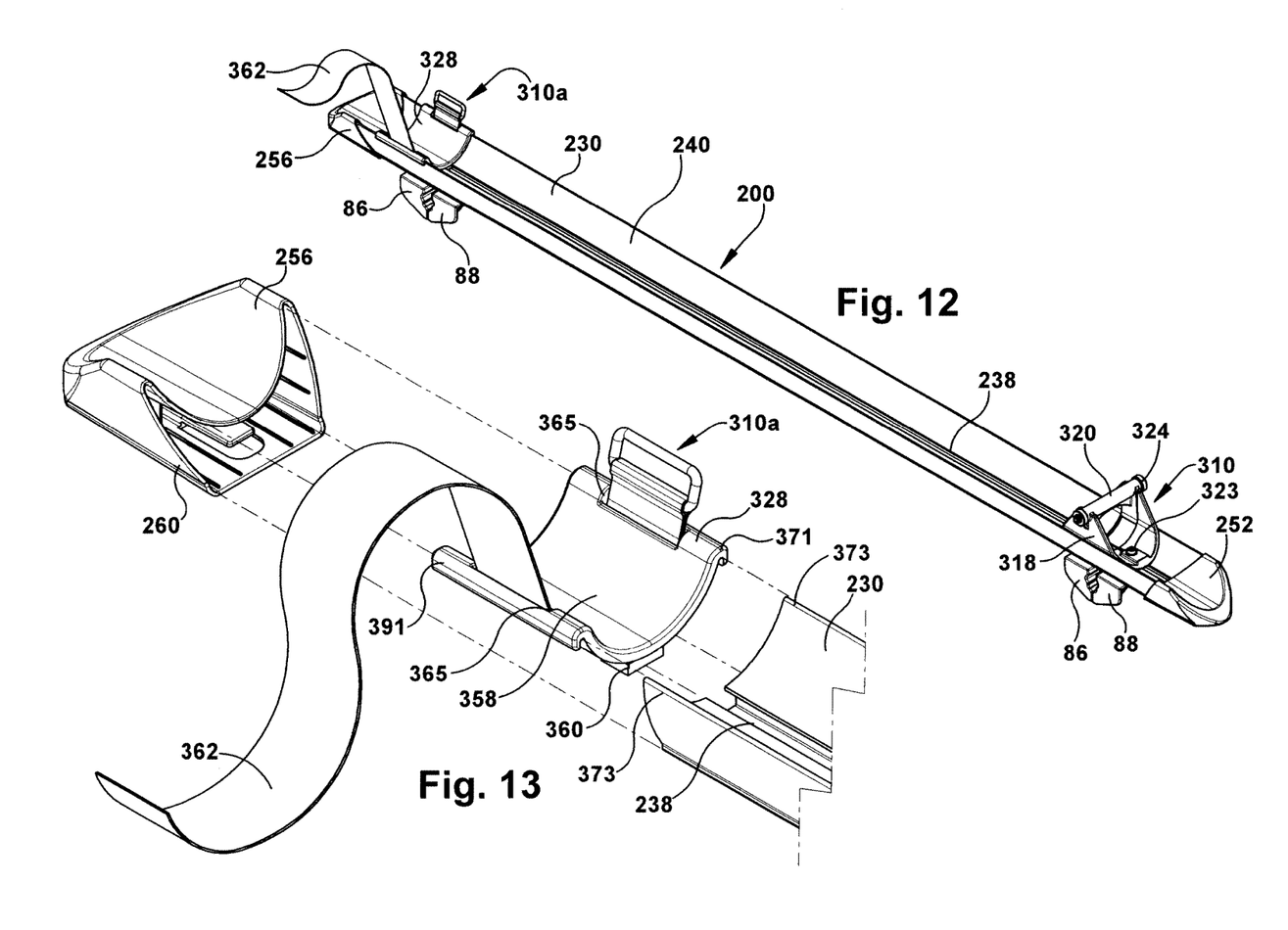
FIG. 12 is a perspective view embodiments of a cargo mounting system.
FIG. 13 is a partially exploded view of the cargo mounting system of FIG. 12.

The rail 230 may further include a first end portion 252 and a second end portion 256 that may be capable of selectively and/or fixedly attaching to the rail 230. In some embodiments, the first and/or second end portions 252, 256 may include an opening 261 such that the rail 230 may be inserted therein. This may result in the first and/or second end portions 252, 256 generally circumscribing the rail 230 when attached thereto. The first and/or second end portions 252, 256 may further include an engaging member 263 configured to operatively engage with either of the first or second engaging members 238, 239. By way of a non-limiting example, the engaging member 263 may be configured to operatively engage with the slot 238 as shown in FIG. 13. In addition, the first and second end portions 252, 256 may be of a generally same profile and shape as that of the rail 230 such that when attached the combination thereof has a generally continuous shape. This may allow the first and second end portions 252, 256 to be selectively attachable to the rail 230. Still further, the first end portion 252 may include a front portion that has a generally aerodynamic shape and the second end portion 256 may have an end portion that may generally create a terminus end. This may form a rail 230 that has an aerodynamic front portion such that when it is placed on the roof 26 of the vehicle 22 it may provide good aerodynamic characteristics. The terminus end 256 may provide a rail 230 that has a clear end portion.

The cargo mounting system 200 may further include at least one accessory adapter bracket 310 that may be capable of attaching to the rail 230. While the drawings show two such accessory adapter brackets 310, 310a being used, any number of accessory adapter brackets 310 may be used depending upon the appropriate use thereof. In addition, while the accessory adapter brackets 310, 310a are shown as being a bike rack, the present teachings are not limited to such and can be any kind of adapter brackets 310, 310a, including, without limitation a ski rack, boat rack, surf board rack, or the like.

The accessory adapter brackets 310, 310a may allow accessories or items to be to be mounted to the rail 230. In some embodiments, the adapter brackets 310, 310a may be configured to operatively engage the rails 230 and to be selectively positionable along at least a portion or all of the length of the rail 230. In some embodiments, one of the adapter brackets 310 may be fixed while the other of the adapter brackets 310a may be configured to be selectively positionable along at least a portion of the length or all of the length of the rail 230.

As shown in FIG. 12, the first adapter bracket 310 may include an accessory adapter body 318 to which an accessory or item may attach. The accessory adapter body 318 may extend away from the rail 230. The accessory adapter body 318 may include an accessory attaching device 320. As shown in FIG. 12, the accessory attaching device 320 may be a bike-securing device 324 that may selectively secure thereto a bicycle. As shown in FIG. 12, the first adapter bracket 310 may include a fastener 323 that may secure the first adapter bracket 310 in an operative position on the rail 230. Once the fastener 323 is tightened onto the first adapter bracket 310, either of the first or second clamping members 86, 88 may be fixed relative to the rail 230. Loosening the fastener 323 may permit the first adapter bracket 310 to be selectively positionable along the slot 238 and either of the first and second clamping members 86, 88 being moveable along the second engaging member 239.

The second adapter bracket 310a may correspond to the bike-securing device 320. In such embodiments, the second adapter bracket 310a may be selectively securable to the first engaging member 238 of the rail 230. The second adapter bracket 310a may include a strap member 328 that may be capable of securing the bicycle to the rail 230. In such embodiments, the accessory attaching device 320 may secure a front portion of the bicycle and the strap member 328 may secure a rear portion of the bicycle to the rail 230.

The strap member 328 may include a body 358 that may include a male engaging member 360 that may slidingly engaging the first engaging member 238 of the rail 230. By way of a non-limiting example, the male engaging member 360 may be a generally male T-shaped member that may be correspondingly shaped and sized with the first engaging member 238. This may allow the strap member 328 to be selectively slidable along the entire length of the first engaging member 238, or alternatively along a portion of the length of the first engaging member 238. It should be understood, however, that while male engaging member 360 is shown and described as a male member and the first engaging member 238 is shown and described a female engaging member, the present teachings are not limited to such. The member 360 may be a female engaging member and the first engaging member 238 may be a corresponding male engaging member. Still further, while the member 360 is shown and described as having a shape and size corresponding to the first engaging member 238, it may also have a shape and size that may correspond to the second engaging member 239.

The strap member 328 may further include a pair of apertures 365 configured to operatively attach a strap 362 to the strap member 328. In such embodiments, the strap 362 may be inserted into and through the apertures 365 such that the strap 362 may engage a bike attached to the cargo mounting system 200. By way of a non-limiting example, the strap 362 may be of a shape and size such that it may be secure around a bicycle tire.

Figure 14:
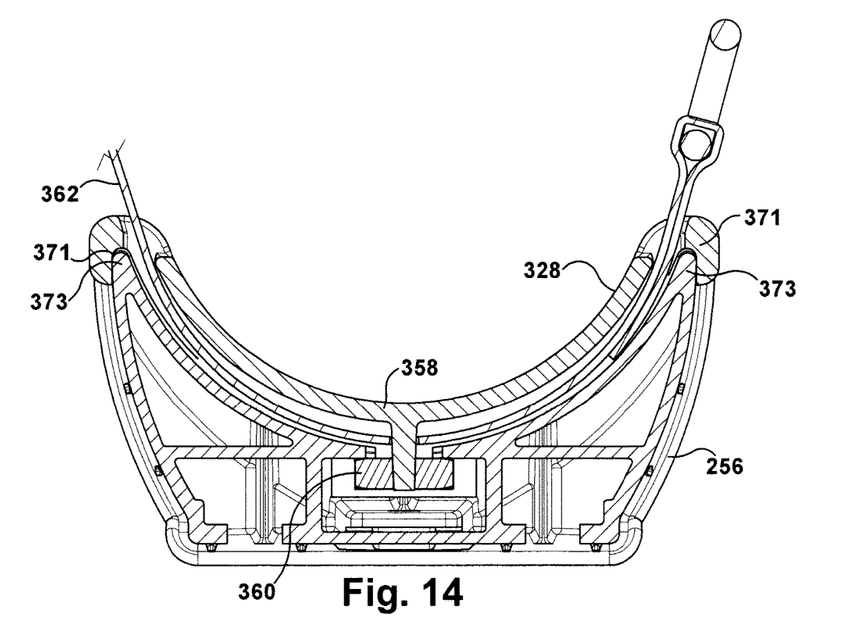
FIG. 14 is a cross sectional view of the cargo mounting system along line 14 of FIG. 12.
Figure 15:
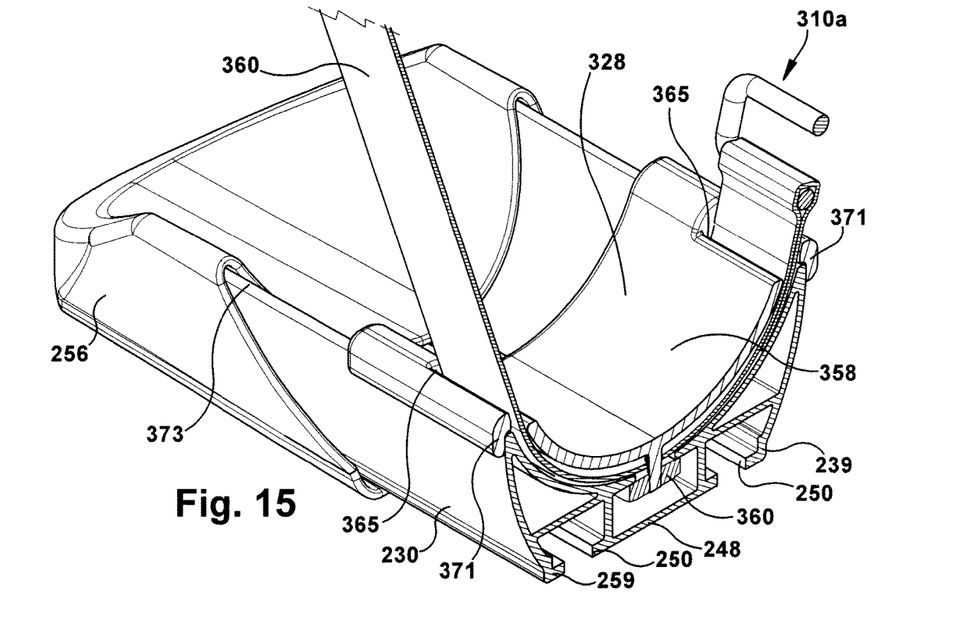
FIG. 15 is a cross-sectional view of an end portion of the cargo mounting system of FIG. 12.

The strap member 328 may further include a rail engaging member 371. As shown in FIGS. 13-15, the strap member 328 may include a pair of rail engaging members 371. It should be understood, however, that any number of rail engaging members 371 may be used. The rail engaging members 371 may be configured to slidably engage end portions 373 of the rail 230 as shown in FIG. 13. The rail engaging members 371 may slide onto the end portions 373 of the rail 230. The rail engaging members 371 may maintain contact between the strap member 328 and the rail 230. The rail engaging members 371 may generally prevent the strap member 328 from being pulled away from the rail 230. Further still, the rail engaging members 371 may keep the strap members 328 in their operative position relative to the rail 230. The rail engaging member 371 and the male engaging member 360 may keep the strap member 328 operatively engaged with the rail 230. This may be especially useful when a user applies an upward force on the strap 362 while engaging the bicycle tire. In the embodiments shown, the rail engaging member 371 and the male engaging member 360 may provide at least three points of engagement preventing the strap member 328 from being pulled away from the rail 230 maintaining its operative position.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. A cargo mounting system comprising:
   a rail having a top, a bottom, and a length;
   a first engaging member positioned on the top of the rail;
   a second engaging member positioned on the bottom of the rail;
   a first clamping device selectively positioned on and moveable with respect to the second engaging member along the bottom of the rail,
   a second clamping device selectively positioned on and moveable with respect to the second engaging member along the bottom of the rail, the second clamping device moveable independent of the first clamping device, wherein the first and second clamping devices are configured to engage a roof rail of a vehicle operatively securing the rail to the vehicle;
   a first accessory mounting member selectively positioned on and moveable with respect to the first engaging member along the top of the rail, wherein the first accessory mounting member is capable of engaging an item;
a second accessory mounting member selectively positioned on either the first or second engaging member; and
a pair of end members selectively attached to either of the first or second engaging members,
wherein the rail further includes a curved wall extending upward from the first engaging member.

2. The cargo mounting system of claim 1, further comprising a fastener selectively attached to and engaging the first and second clamping devices together with the roof rail of the vehicle wedged between the first and second clamping devices selectively securing the rail to the roof rail of the vehicle.

3. The cargo mounting system of claim 1, wherein the first and second clamping devices are configured to vertically engage the roof rail.

4. The cargo mounting system of claim 1, wherein the first and second engaging members extend along a majority portion of the length of the rail.

5. The cargo mounting system of claim 4, wherein the first and second engaging members extend along an entirety of the length of the rail.

6. The cargo mounting system of claim 5, wherein the first and second clamping devices are moveable on the second engaging member along the entirety of the length of the rail.

7. The cargo mounting system of claim 5, wherein the first accessory mounting member is positionable on the first engaging member along the entirety of the length of the rail.

8. A cargo mounting system comprising:
a rail having first and second end portions and a length;
a first engaging member positioned on the rail between the first and second end portions;
a second engaging member positioned on the rail between the first end portion and the second end portion, opposite of the first engaging member;
a first accessory mounting member selectively securable on the rail by way of the first engaging member;
a second accessory mounting member engageable on the first or second engaging member;
at least one vehicle attaching member selectively securable on the rail by way of the second engaging member, wherein the at least one vehicle attaching member includes first and second clamping members, the first clamping member positioned on and moveable with respect to the second engaging member and the second clamping member positioned on and moveable with respect to the second engaging member, the first clamping member moveable independent of the second clamping member; and
a pair of end members selectively attachable to either of the first or second engaging members,
wherein the rail further includes a curved wall extending upward from the first engaging member.

9. The cargo mounting system of claim 8, wherein the first and second clamping members are configured to vertically engage different shaped roof rails.

10. The cargo mounting system of claim 8, wherein the first and second engaging members each include one of a channel, track, or slot having a length and a corresponding male engaging member is slidably engaged thereto.

11. The cargo mounting system of claim 8, wherein at least one of the first and second engaging members comprise a channel, track, or slot having a second length, whereby the length is equal to the second length.

12. The cargo mounting system of claim 11, wherein the second engaging member is integrated with the rail so that the rail includes the channel, track, or slot and the vehicle attaching member includes corresponding male engaging members on each of the first and second clamping members.

13. The cargo mounting system of claim 12, wherein the rail includes a female generally T-shaped slot and each of the male engaging members is a generally T-shaped male member.

14. The cargo mounting system of claim 12, wherein the second accessory mounting member includes a second male engaging member whereby the second accessory mounting member is selectively and independently securable to the rail.

* * * * *